(12) United States Patent
De Mendonça Fava et al.

(10) Patent No.: US 6,959,527 B2
(45) Date of Patent: Nov. 1, 2005

(54) PROCESS AND DEVICE OF RELATIVE POSITIONING BETWEEN AGRICULTURAL MACHINES AND CROPS ON THEIR PLANTING ROWS

(75) Inventors: João Francisco De Mendonça Fava, Pompeia (BR); Edson Lucio Domingues, Pompeia (BR); Roy Scudder, Ribeirao Preto (BR)

(73) Assignee: Maquinas Agricolas Jacto S.A., Pompeia (BR)

( * ) Notice: Subject to any disclaimer, the term of this patent is extended or adjusted under 35 U.S.C. 154(b) by 68 days.

(21) Appl. No.: 10/371,331

(22) Filed: Feb. 21, 2003

(65) Prior Publication Data

US 2003/0226345 A1 Dec. 11, 2003

(30) Foreign Application Priority Data

Feb. 22, 2002 (BR) .............................................. 0200591

(51) Int. Cl.[7] .............................................. A01D 75/28
(52) U.S. Cl. .................................. 56/10.2 R; 56/328.1
(58) Field of Search ............................. 56/340.1, 328.1, 56/10.2 R, 10.2 D, 10.2 E, 10.2 F, DIG. 2, DIG. 15

(56) References Cited

U.S. PATENT DOCUMENTS

| 2,805,612 | A | * | 9/1957 | Beard ........................... 172/79 |
| 3,184,908 | A | * | 5/1965 | Rust ............................. 56/330 |
| 3,959,959 | A | | 6/1976 | Louault et al. |
| 3,972,381 | A | * | 8/1976 | Gail ............................ 180/401 |
| 4,172,352 | A | * | 10/1979 | McCarthy et al. .......... 56/340.1 |
| 4,173,859 | A | | 11/1979 | Goldsmith et al. |
| 4,341,062 | A | * | 7/1982 | Scudder ....................... 56/330 |
| 4,860,529 | A | * | 8/1989 | Peterson et al. .............. 56/330 |
| 5,426,927 | A | * | 6/1995 | Wang et al. ................ 56/328.1 |
| 5,488,817 | A | * | 2/1996 | Paquet et al. ............ 56/10.2 R |
| 5,661,963 | A | | 9/1997 | Scott |
| 5,685,773 | A | * | 11/1997 | Meester et al. ............. 460/113 |
| 5,904,034 | A | * | 5/1999 | Youman et al. ............ 56/328.1 |
| 5,946,896 | A | | 9/1999 | Daniels |
| 6,155,036 | A | * | 12/2000 | Pellenc ...................... 56/328.1 |
| 6,178,730 | B1 | * | 1/2001 | Visser ....................... 56/340.1 |
| 6,360,518 | B1 | * | 3/2002 | Scott et al. ................ 56/328.1 |

FOREIGN PATENT DOCUMENTS

| BR | PI9604404-7 A | 6/1998 |
| FR | 19731107 | 11/1973 |
| FR | 19730039515 | 11/1973 |
| NZ | 179552 | 12/1975 |

* cited by examiner

Primary Examiner—Thomas B. Will
Assistant Examiner—Alicia Torres
(74) Attorney, Agent, or Firm—Michael J. Striker (57) ABSTRACT

A method of relative positioning between agricultural machines and crops on their planting rows having the steps which are performed in real time and during a harvest work and include determining a positioning of each tree top on a trees row, a machine rotor column position, and simultaneously a traveling speed of an agricultural machine, sending tree positioning and machine speed data to a data processor, processing the data and controlling servo mechanisms that actuate actuators which, in turn, place one rotor column with stripping rods in accordance with a determined tree top position and format.

12 Claims, 6 Drawing Sheets

PROCESS AND DEVICE OF RELATIVE POSITIONING BETWEEN AGRICULTURAL MACHINES AND CROPS ON THEIR PLANTING ROWS

BACKGROUND OF THE INVENTION

The present invention relates to a method and device of relative positioning between agricultural machines and crops on their planting rows and more particularly to a method and device of active positioning of the agricultural machines elements, particularly for harvesting machines, next to the planting rows. More specifically, it is about a process and device of relative positioning between agricultural machines and crops on their planting rows, which favored application concerns the positioning of "stripping rotors" or similar harvesting elements used in many types of harvesters, mainly those of fruits.

As it is known, the attempt to position the active parts of the machines in the best position in relation to the points or area to be worked is obvious and consists of a continuous work of machine development teams. The efforts to achieve the control of the positioning between machine and planting row go from the static positioning at a given level or position to a dynamic following of a trajectory that is in accordance with a desired work area, in relation to the trees tops.

In this kind of activity there are many attempts in this direction, because generally the plants have their work targets: stem, branches, leaves and fruits, distributed in a more or less regular form for the same species and depending on the target to be reached, a more appropriate positioning can be vital for the better efficiency of the work or even its success.

Many ideas have already appeared, as well as equipment to assist in the positioning of active sets of harvesters, sprayers or other items of agricultural machines, and some items really became commercial products.

Some of such equipment are controlled by the operator, others are adjusted automatically through physical contact with the trees, even having counterweight or spring loaded systems as movement assistance.

Other ideas are also presented in such a way so as to have the active sets "copy" the trees during the service, on just one side or on both sides simultaneously, however how the devices would perform such activity is not indicated or specified.

The idea of positioning and/or displacing a device, whether harvest or any other type, to perform an agricultural task is already of public domain. In this sense, many patent applications are found, some of which became, as said, commercial products.

Amid the existent technology, one can mention that as defined on the U.S. Pat. No. 3,959,959, published in 1976, that claims the priority of French Patents FR19730039515 and FR19731107. The latter is a patent designed for the grape harvest by using two or more pairs of rotors, and in its claims the rotors of the same pair can get closer to or away from each other in order to better reach the goals of the harvest. Here, the normal position of the rotors is closer to the machine center, and the rotors move away because of the thrust received from the trees mass and in the absence of these forces, the return to the original position occurs through spring force. More specific details regarding this feature are not given.

Other solution known is that as defined in U.S. Pat. No. 4,173,859 of 13 Nov. 1979, derived from New Zealand Patent No. 179552, of 15 Dec. 1975, that foresees the rotors actuation in double pairs, now obligatorily, that also mentions in its claims "means of assembly that allow the rotors to move transversely". In the patent one also does not claim the way how to obtain said effect.

One more solution is defined in U.S. Pat. No. 5,661,963, filed on 21 Apr. 1995, that generate the later filing in Brazil, on 16 Jan. 1996, under No. PI9604404-7, where in one claims a device to transform a fixed rotor in a copier rotor of trees tops in order to work them, and said device is fixed pivotally on the posterior corner of the bearer vehicle. Said bearer vehicle, when passing next to the trees rows, would allow the rotor to work the trees top in displacing from the back to the outside of the conveyor. A movement system, generated by spring load would tend to keep the rotor on the side and as far as possible from the bearer, in which occasion the rotor would reach the farthest branches. The thrust caused by the foliar mass would force the rotor back to the position on the conveyor rear when the conveyor is tangent to the trees. Thus, by action of these two opposite forces, the device allows the rotor to pass tangentially to the rows and work, sequentially, half of all perimeters of the trees set in planting rows.

There are other attempts to obtain the positioning of the stripping sets, such as that in U.S. Pat. No. 5,946,896, dated of 7 Sep. 1999, wherein four stripping sets fastened on common support mounted on a conveyor trailer, are controlled manually by an operator who, utilizing hydraulic means, positions said stripping sets on the working areas of the trees tops. The operator chooses the area to be worked and drives the stripping machine to this region; once this area is harvested, the same will be driven to another area and so on.

Now, treating more specifically the harvest processes, it is known that the fruits generally are not distributed on the trees tops in general uniformly; in most cases, their location is concentrated on the most external part of the top, where the insulation is more active. Thus, in the inner parts of the tops, a few or no fruits are found. On the other hand, the fruits are distributed around the whole top.

Normally the harvesters, while working, are displaced either over the trees or at the side of the trees rows, being tangent to the tops. The harvesting devices seek to work the tops and reach all places where the fruits are. In the event of stripping machines that use rods to strip fruits, the rods must have appropriate length in order to reach all top points that bear fruits. One of the inconveniences of these types of said harvesters, that work passing over the trees or displacing laterally to the tops, is the difficulty that both have to reach the region of tops that are placed between the trees, i.e., in the direction of the planting rows. This is the farthest region from the rotors, the points to which the vibratory rods are fastened.

The conventional way used to overcome this difficulty is to use longer rods and to work with the rotors as close of the tops side as possible. However, it occurs that the use of longer rods can be undesirable because they reach many times the sensible parts of trees and can still have their performance jeopardized due to their long length.

SUMMARY OF THE INVENTION

One of the purposes of this invention is to provide a method and device of relative positioning between agricultural machines and crops on their planting rows that allows to position an active harvest element, for example, a stripping rotor on a preset and desired position for that situation of harvest and besides to continue to keep and correct this position in the course of the work.

Another purpose of this invention is to provide a method and device of relative positioning between agricultural machines and crops on their planting rows to allow to predetermine a desired work position. This desired position can be fixed and constant distance, for example, from the trees center on the planting rows, or a travel keeping a preset distance from the trees tops. This to allow to maintain the harvest element, for example, a rotor, on a trajectory that is always equidistant to the top.

Another purpose of this invention is to provide a method and device of relative positioning between agricultural machines and crops on their planting rows which position of this trajectory in relation to the ground (height in relation to the ground) is set by the operator, allowing rotor or other service equipment to operate always on the same positions of the trees tops disposed on the tops row at a preset distance.

Another purpose of this invention is to provide a method and device of relative positioning between agricultural machines and crops on their planting rows that give conditions for the rotor to work the area of the top where the fruits or most of them are placed.

Another purpose of this invention is to provide a method and device of relative positioning between agricultural machines and crops on their planting rows that simultaneously in its harvest work follows occasional changes in the form and external relief on the top in order to achieve its higher efficiency of work and/or still place itself in relation to the points with larger quantity of fruits.

Another purpose of this invention is to provide a method and device of relative positioning between agricultural machines and crops on their planting rows that promotes relative positioning only on the side of the tree top being worked, i.e., only one half of the tree, which is determined by a vertical plan that passes through the planting rows of the same in the place.

Another purpose of this invention is to provide a method and device of relative positioning between agricultural machines and crops on their planting rows that carries out a consecutive work on the same sides of trees disposed in planting rows, so that each half of the tree is worked, considering the contour of every one of the tops separately.

Another purpose of this invention is to provide a method and device of relative positioning between agricultural machines and crops on their planting rows that allows an individualized work for each tree top, and said work is carried out automatically, without the operator's interference, except when setting initial parameters of work and when deciding to change them eventually.

Another purpose of this invention is to provide a method and device of relative positioning between agricultural machines and crops on their planting rows that can be adapted to the different tops types, whether they tend to be conical, cylindrical or spherical, and also to the different spacing types between trees existing on planting rows.

Another purpose of this invention is to provide a method and device of relative positioning between agricultural machines and crops on their planting rows that allows to accommodate automatically the vertical inclination of the rod supporting column through two actuators controlled by the processor, based on the sensing data received.

Another purpose of this invention is to provide a method and device of relative positioning between agricultural machines and crops on their planting rows that promotes an adjustment of the rod rotor lateral inclination through an actuator manually actuated by the operator, and this actuator is placed on the upper part of the rotor supporting structure.

Another purpose of this invention is to provide a method and device of relative positioning between agricultural machines and crops on their planting rows that to sense the trees tops uses one or more sensors, depending on the top form and/or the vegetation type in question, and the sensing type desired.

Another purpose of this invention is to provide a method and device of relative positioning between agricultural machines and crops on their planting rows that can also be applied to the trees upper part by similar elements to the herein before described conveniently placed on the tops and horizontally positioned substantially. The same sensing, moving and displacement characteristics described will be applied to use on the upper part of the tops.

Another purpose of this invention is to provide a method and device of relative positioning between agricultural machines and crops on their planting rows that can be used mounted on trailed or self-propelled bearer vehicle, working one side of the trees at a time, or working whole plants at a time by passing over the same.

Another purpose of this invention is to provide a method and device of relative positioning between agricultural machines and crops on their planting rows to allows to harvest simultaneously and fully said trees.

These and other purposes and advantages of this invention are attained with a method of relative positioning between agricultural machines and crops on their planting rows that in real time and during the harvest work comprises the stages of: determining the positioning of each tree on the planting row and simultaneously determining the displacement speed of the agricultural machine; sending data of tree positioning and machine speed to the processor; processing data and controlling servomechanisms that actuate the actuators that, in turn, place the rotor column according to the position and form of the tree top.

Also a part of this invention is a device of relative positioning between agricultural machines and crops on their planting rows that aims to improve the access of the stripping sets or harvest sets to reach top points which are difficult to reach, causing the rotors to change the position as the harvesters are displaced, and said change is determined according to a trajectory that keeps them at a certain distance from the top which, in turn, is appropriate to the harvest work. This distance can be changed by the operator according to the trees features. To determine the tops position in relation to the harvester, a sensing system at a distance is used, for example, ultrasound (the sensing system is not restrictive on the claim) which recognizes the top contour (at the sensing height) and determines a trajectory for the rotor to displace, maintaining itself always at the same distance in relation to the top. This way, the rotor follows a similar trajectory to the figure of the horizontal section.

It is foreseen that the rotor works one half of the top on each side, thus, angularly there is a work angle from 0° up to 180°, once it reaches 180°, the system determines a trajectory of displacement parallel to the trees trunks row (crop planting row) until the rotor comes close to the following tree, when a new following trajectory will be initiated, now for a new tree.

In the above description it is supposed that the rotor maintains itself on a position, substantially vertical or inclined, however a change on the rotor inclination position is foreseen in order to adjust itself to the trees tops side. The rotor inclination can be changed by the operator through manual controls.

In a second and now more sophisticated version for trees top following, the sensing of two or more top heights is foreseen, when it is possible to define an inclination for the rotor in order that the same adapt itself on the vertical and can remain at a parallel and equidistant position in relation to the top side inclination. The adjustment of this inclination will be continuous and automatic, controlled by the system processor, starting from the sensing data received.

This way, trees with more conical tops on the vertical can also be worked sequentially and with full efficiency of the rotors rods. Therefore, with these two types of sensing, both the following regarding the "perimeter" (of top transversal section) and the accommodation to the vertical form of the top can be obtained and the work of the rods on the same can be effected more efficiently.

Therefore, these and other purposes and advantages of this invention are attained with a device of relative positioning between agricultural machines and crops on their planting rows that comprises, at least, one position sensor disposed on the agricultural machine mounted on the rotor column where the stripping rods are fitted; and a speed sensor disposed next to the tractor's axle of the agricultural machine is still foreseen; and said sensors are electrically connected to a data processor that, in turn, is electrically connected to servomechanisms that act with mechanical, hydraulic, pneumatic or electric actuators that move the rotor's axle to a near and predetermined position of the tree contour. In order to have control over the rotor position and displacement, there still is a sensor for the rotor position in relation to the machine chassis.

DESCRIPTION OF THE PREFERRED EMBODIMENTS

A device of relative positioning between agricultural machines and crops on their planting rows, also subject of this invention, is applied to a harvesting machine which, constructiveness is not part of the scope of the invention, therefore it will not be described in details.

Thus, the positioning device has its preferential application on a fruit harvest through vibratory rods (1) mounted on a rotor (2) supported by a chassis (3), and the rotor (2) is subject to displacing itself in relation to the chassis (3) through actuators (4) to be described hereinafter.

The positioning device being defined by an electro-electronic processor (5) that is supplied with information obtained by a position sensor (7) of the rotor (2) disposed on the chassis (3) structure, by top position sensors (6) also disposed on the chassis (3) structure, mounted on the rotor (2), in such way so as to sense the form and position of the fruits concentration area ($P^1$) of the trees top (P) to be worked, and by the machine displacement speed sensor (8). The electronic processor (5), in turn, controls the actuators (4), based on the data received by the different sensors.

This electronic processor (5) analyzes the distance from the tree top (P) in relation to the harvest device; the working speed; the position and form of the tops (P); additional adjustments introduced by the operator and other inherent data to the processing system required by the processor (5), to then actuate the actuators (4) to position the rotor (2) with its rods (1) at a preset distance from the trees top (P).

Figure 1:
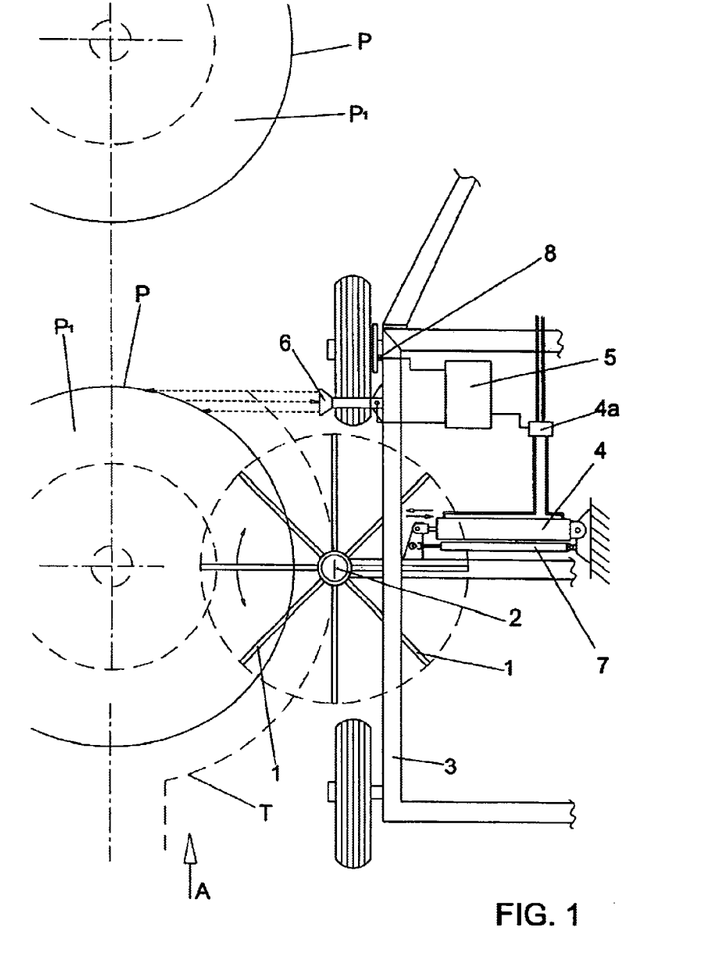
FIG. 1 is a schematic plan view of an agricultural implement provided with a device of relative positioning between agricultural machines and crops on their planting rows and that represents the basic operation of the claim in question, as acting on one of the tree tops sides.
Figure 2:
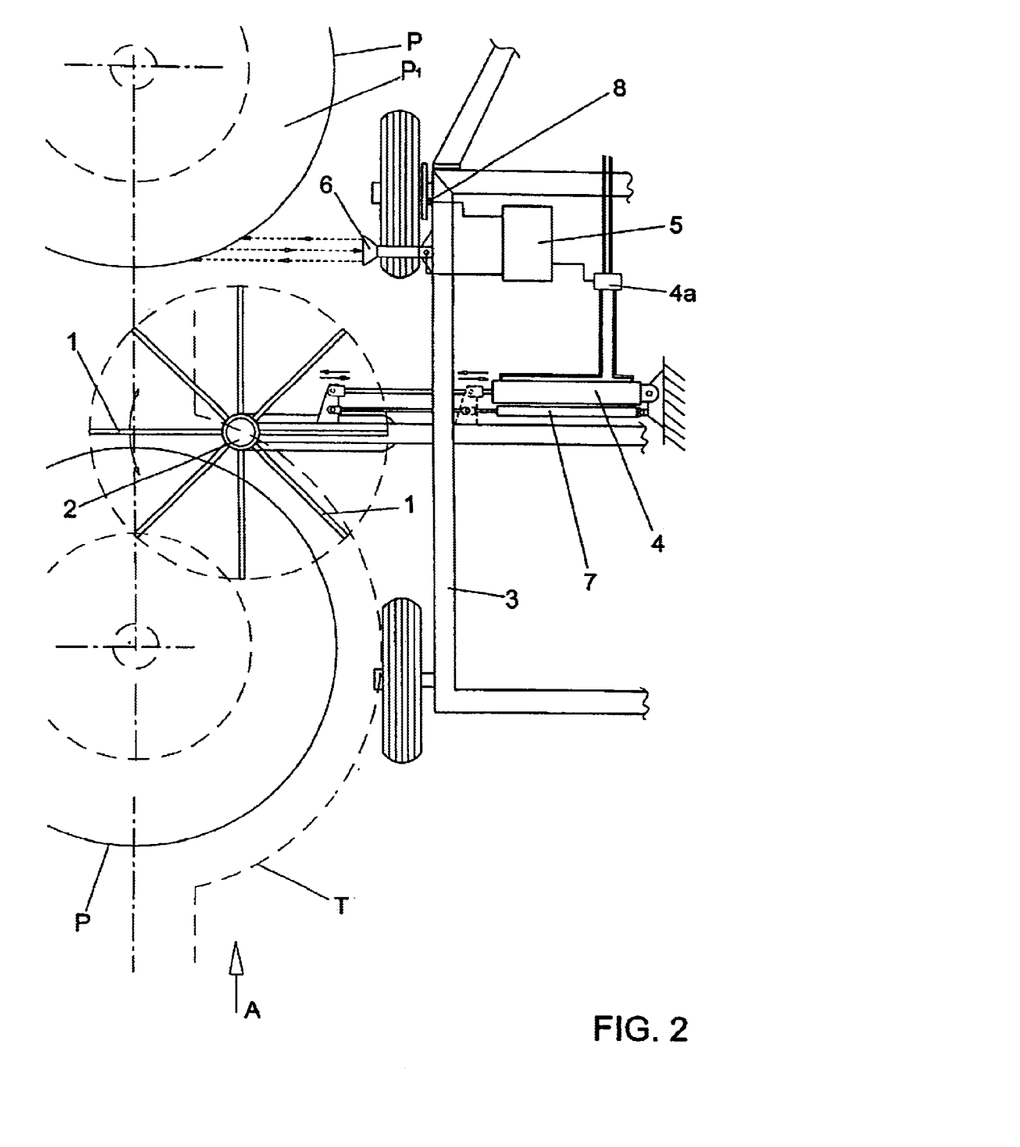
FIG. 2 is the same schematic plan view of FIG. 1 assembly, showing the position that the rotor takes in relation to the tree after proceeding with its work over the same and before moving away from the same in the direction of the next tree.

As shown in FIGS. 1 and 2, when the agricultural machine is moving, the sensors (6) act signaling the section of tree top (P) at the height of its installation point next to the chassis (3); sending to the processor (5) the tree area which one desires the rotor (2) rods (1) to act.

Thus, all planting row along a determined trajectory (T) is mapped by the tops (P) position sensors (6), so that the travel of the rotor center (2) is modified by the data processor (5) through actuators (4). In the absence of one or more trees on the planting row, detected by the sensor (6), the rotor (2) will remain on standby at the maximum distance at its position. It will maintain this position while there is no tree. With the approach of a new tree, a new following trajectory for the rotor (2) will be reinitiated. Therefore, the trajectory followed by the rotor (2) on the region among the trees (P), see FIGS. 2 and 5, reaches the end on its distention course defined by the actuators (4), in such a way that, at this point, this is the most distance position from the chassis (3) that the rotor takes after performing its work over a tree (P) and before initiating the next tree (P).

Figures 3, 4:
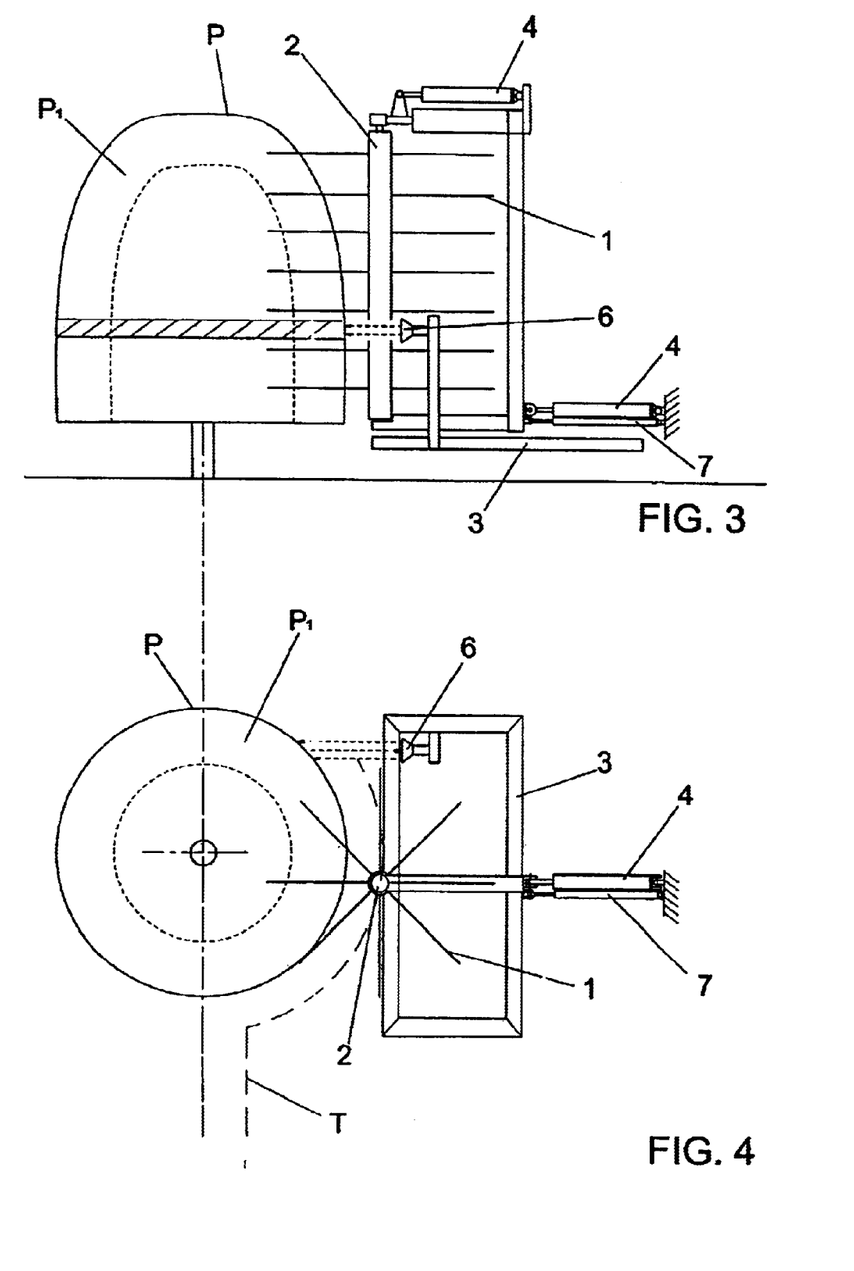
FIG. 3 is a schematic side view taken according to the arrow "A" in FIG. 1.
FIG. 4 is a schematic plan view of the situation shown in FIG. 2.

FIG. 3 shows that the chassis bearing the stripping set (1) and (2) has a position sensor (6) that positioned at the average height of the crop provides a sensing that determines the "perimeter" of the top (P). In this Figure one notes that the chassis (3) has, acting as interconnection of the stripping set (1) and (2), two actuators (4) that will make possible to actuate and change the position of the stripping set (1) and (2) in relation to the tree top (P).

One points out that the actuators (4) can be of any type (in the indicated case, a hydraulic piston), which function is to adjust the rotor (2) position in relation to the tree (P).

Figure 6:
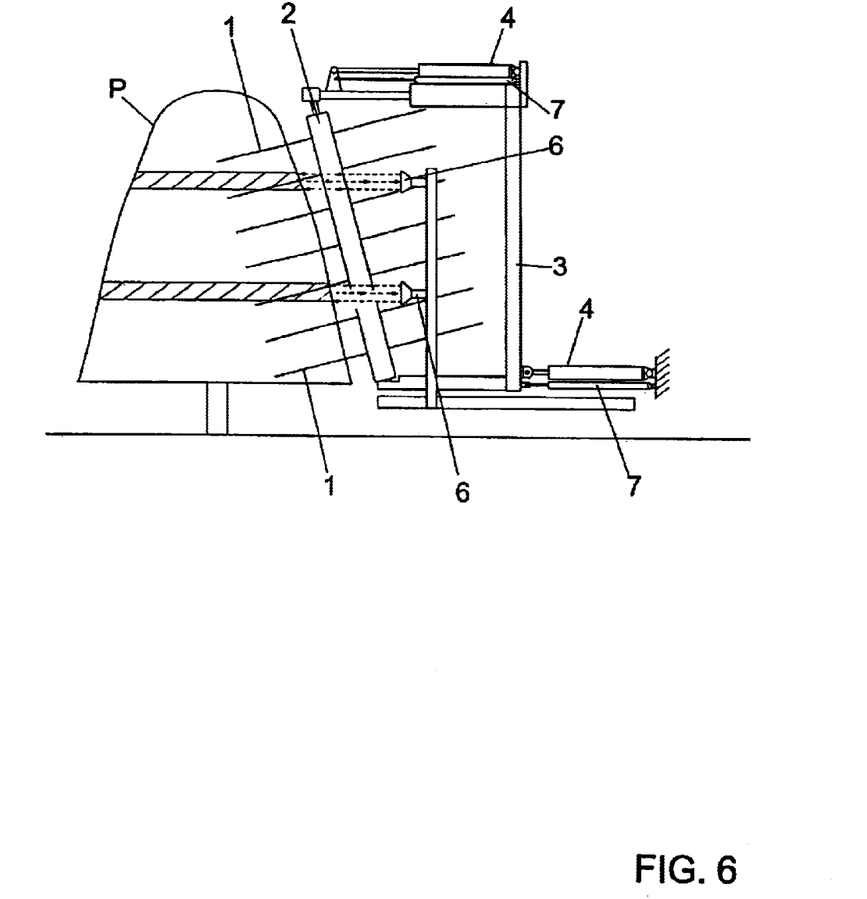
FIG. 6 is schematically and laterally the same side view of FIG. 3, showing a "comic" tree top.

This solution of two actuators (4) allows a rotor (2) inclination displacement in relation to the chassis (3), in such a way that the trees direction be followed in order to allow the same to better adapt itself to the "conical form" of the top, see FIG. 6.

On the simplified version of the harvester set, the actuation of this rotor inclination adjustment will be controlled by the operator at will.

Figure 5:
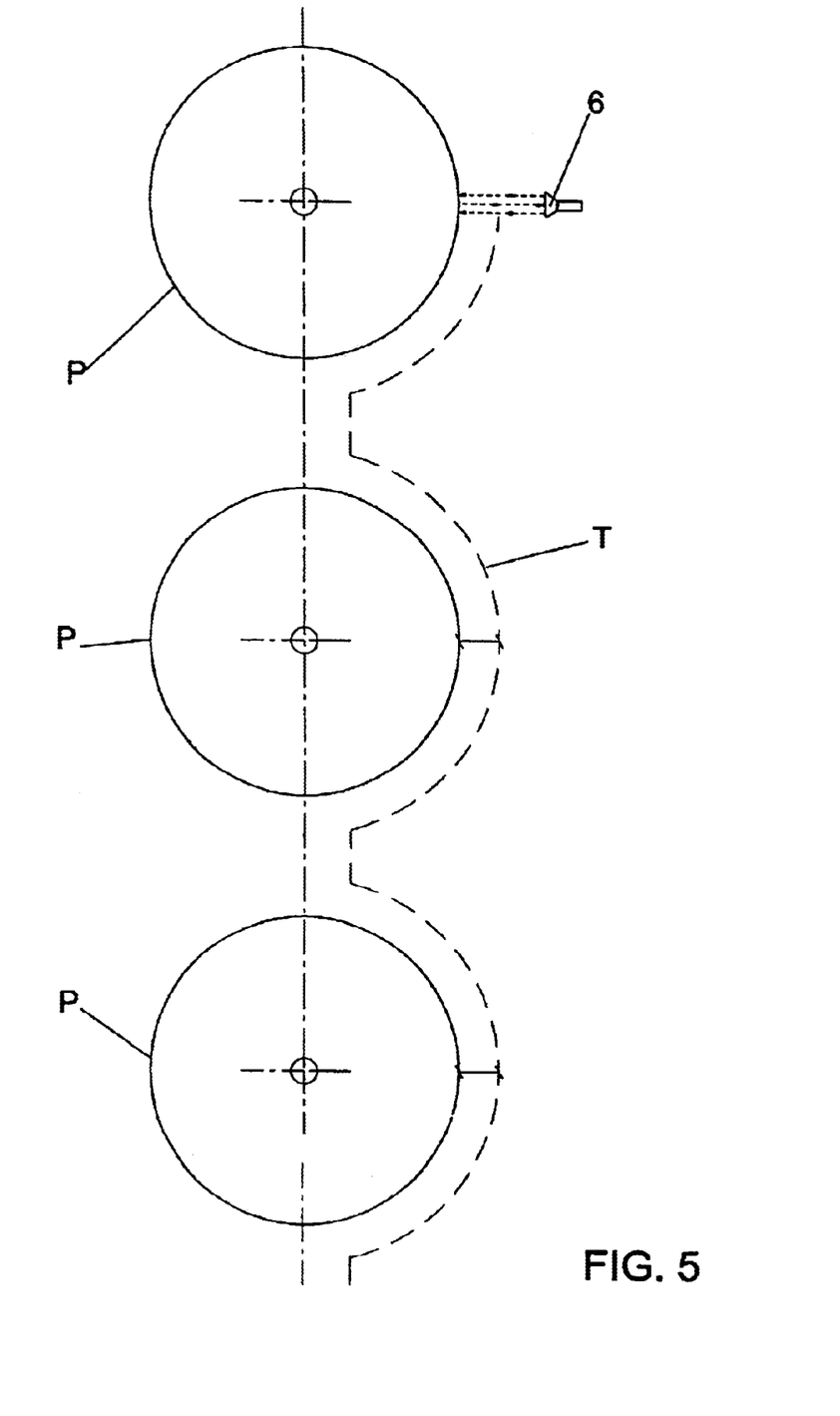
FIG. 5 is, schematically, a plan view of an alignment of trees where their tops show the planting position and the trajectory determined by the processor as the path to the stripping machine column base center.

In FIG. 5 there is an alignment of trees (P) mapped by the position sensor (6) of the device and sent to the processor (5), which determines the path for the column base center of the stripping set (1) and (2).

As mentioned hereinabove, when the device is provided with two actuators (4), see FIGS. 3 and 6, the processor (5) controls simultaneously all actuators (4). But if besides two actuators, the device provides more than one position sensors (6), the processor receives more detailed information on the contour of the tree top (P) and will control the actuators (4) to position the rotor (2) of the stripping set (2) at a plane that will be inclined and as much parallel as possible to the inclined or conic tree top (P).

For this assembly option, the device has, for example, a double sensing (6) at different heights, thus allowing the inclined rotor (2) to position according to the angle processed and calculated by the system data processor (5). FIG. 6 illustrates the two sensing areas; where the second actuator (4) (upper actuator) acts automatically under the processor (5) control for the displacement of the rotor (2) upper part. The number of sensors (6) can be two or more depending on the sensing type and the trees foliage type.

Figure 7:
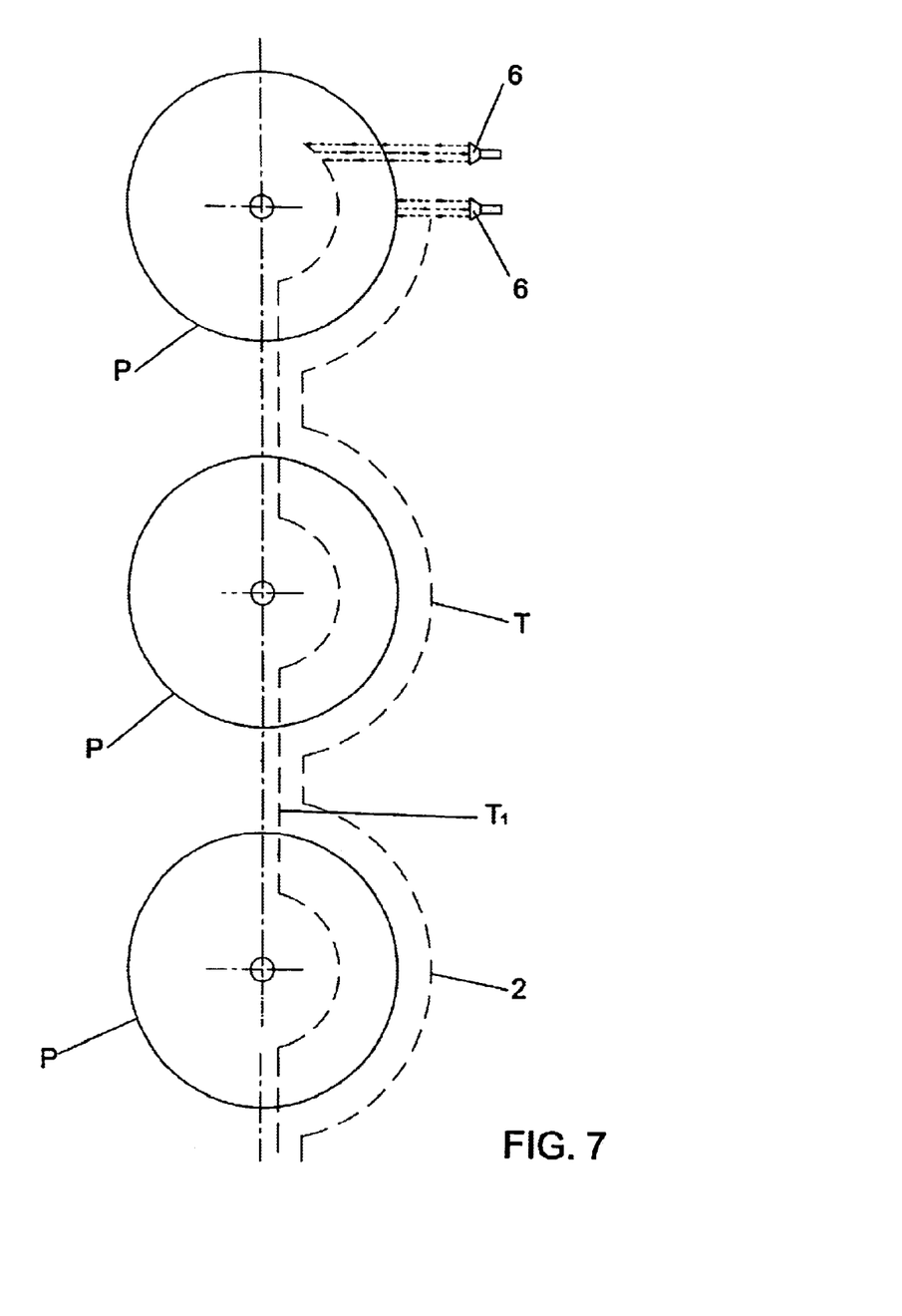
FIG. 7 is a schematic plan view similar to FIG. 5, showing the two trajectories determined by the processor for the rotor axle, in such a way that the rotor remains equidistant of the top at the height positions determined by the respective sensors.

This condition of double sensing is shown in FIG. 7 through dotted lines that show two trajectories (T) and ($T^1$) determined by the processor (5) for the rotor (2) shaft, in such a way that the rotor (2) remains equidistant from the top (P) at the height positions sensed respectively by each one of the sensors (6).

Thus operationally, the position sensor (6) has as function to measure the distances between itself and the tree top (P) as it displaces with the machine (chassis 3), sending this information to the processor (5), which, knowing the sensor (6) position, the rotor (2) geometric center, informed by the sensor (7), besides the machine displacement speed, and the distance at which the operator wishes that the rotor (2) works in relation to the tree top (P), calculating the theoretical trajectory position, that must be described by the rotor (2).

Sensor (6) can be of any type, as long as it carries out the function of measuring repeatedly the presented distances and has the condition to send information to the processor (5). For example, these sensors can be ultrasound, laser, infrared, etc. In the example of the Figures, one chose the ultrasound sensor (6), however this shall not limit the request.

Sensor (6) is directly connected to the processor (5), which supplies electric power and to which it sends information.

In the same way, the vehicle moving sensor (8) is a sensor without any special specification, which can be, for example, of "magnetic" type, and must send compatible information to the processor (5), with which it communicates. This information allows an evaluation of the machine traveling speed and its fluctuations in time.

Sensor (7), position sensor of rotor (2), can be of any type, for example, linear, ultrasound, or other, as long as it carries out the function of indicating respectively the rotor (2) position and has conditions to send said information to the processor (5).

The data processor (5) has the function of gathering the information on the trees (P) contour, the rotor (2) position, the vehicle (3) traveling speed and the distance between the rotor (2) and the tree (P) desired by the operator, and through this data to determine the trajectory (T) that the rotor (2) geometric center must follow, so that the distance between the tree (P) and the machine (3) is always that desired by the operator. As defined, the trajectory points calculated by the processor (5) to be traveled by the rotor (2) center can be defined as the geometric place of the equidistant points of trees top sensing area, and this distance is to be measured radially from the trees center. As mentioned, this distance can be established and changed by the harvester operator.

The trajectory to be followed by the rotor (2) accompany the contour of the tree (P) up to a point where the rods (1) start passing over the planting row center (P). From this point on, the trajectory will be a parallel line to the said planting row until the trees sensor (6) detects the new tree (P) in the sequence and establishes a new following trajectory, now to the new tree (P). Thus, a new cycle is initiated. Once the system is disengaged, the rotor (2) returns to a rest position, close to the conveyor vehicle. As mentioned, the rotor (2) column is moved by actuating the actuator (4) through the valve (4a) which is controlled by the processor (5). Once a given displacement is decided, the processor (5) actuates the valve (4a) in one or other direction, thus allowing that the fluid, under high pressure, reaches the actuator (4) piston, moving in one or other direction. The elements that generate fluid under pressure are not detailed because they are not claimed on the request.

Despite being described and illustrated with preferential constructive concept, it is worth emphasizing that alterations to the design are possible and feasible without diverging from the scope of this invention.

It will be understood that each of the elements described above, or two or more together, may also find a useful application in other types of constructions differing from the types described above.

While the invention has been illustrated and described as embodied in process and device of relative positioning between agricultural machines and crops on their planting rows, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for relative positioning between an agricultural machine and crops on their planting rows, comprising:

at least one tree contour sensor disposed on said agricultural machine for sensing a contour of a tree, said agricultural machine including a rotor column having a plurality of stripping rods;

a rotor column position sensor for said rotor column;

a moving sensor for sensing the agricultural machine traveling speed disposed close to a tractor axle of said agricultural machine;

at least two actuators for positioning said rotor column, each actuator including a servomechanism, said sensors being electrically connected to a data processor and said data processor being electrically connected to said servomechanisms so as to control said actuators to position said rotor column to a predetermined position based on the sensed tree contour, said data processor controlling simultaneously all of said actuators through information received from the sensors to position said rotor column in a plane inclined parallel to the contour of the tree.

2. The device as defined in claim 1, wherein at least one of said tree contour sensors is positioned at a crop average height.

3. The device as defined in claim 1, further comprising a device to manually adjust the inclination of the rotor column.

4. The device as defined in claim 1, wherein said actuators are selected from the group consisting of hydraulic actuators, pneumatic actuators and electric actuators.

5. The device as defined in claim 1, wherein said tree contour sensors repetitively measure distances and send said measured distances to said data processor.

6. The device as defined in claim 1, wherein said tree contour sensors are selected from the group consisting of ultrasound sensors, laser sensors and infrared sensors.

7. The device as defined in claim 1, wherein said moving sensor sends information to said data processor to allow evaluation of said machine traveling speed and its fluctuations in time.

8. The device as defined in claim 7, wherein said moving sensor is a magnetic sensor.

9. The device as defined in claim 1, wherein said agricultural machine is selected from the group consisting of harvesters that work laterally and tangentially to a trees top and gantry-shaped harvesters that work passing over trees and which are further selected from the group consisting of tractor-driven and self-propelled.

10. A device for relative positioning between an agricultural machine and crops on their planting rows, comprising:
  at least one tree contour sensor disposed on said agricultural machine for sensing a contour of a tree, said agricultural machine including a rotor column having a plurality of stripping rods;
  a rotor column position sensor for said rotor column;
  a moving sensor disposed close to a tractor axle of said agricultural machine;
  at least two actuators for positioning said rotor column, each actuator including a servomechanism, said sensors being electrically connected to a data processor and said data processor being electrically connected to said servomechanisms so as to control said actuators to position said rotor column to a predetermined position based on the sensed tree contour, said data processor controlling simultaneously all of said actuators through information received from the sensors to position said rotor column in a plane inclined parallel to the contour of the tree, wherein said tree contour sensors include sensors at different heights to allow positioning of said rotor column inclined according to an angle processed and calculated by said data processor.

11. A method of relative positioning between an agricultural machine and crops on their planting rows comprising steps which are performed in real time and during a harvest work, the steps comprising:
  providing a device for relative positioning between said agricultural machine and crops on their planting rows, comprising:
    at least one tree contour sensor disposed on said agricultural machine for sensing a contour of a tree, said agricultural machine including a rotor column having a plurality of stripping rods;
    a rotor column position sensor for said rotor column;
    a moving sensor for sensing the agricultural machine traveling speed disposed close to a tractor axle of said agricultural machine;
    at least two actuators for positioning said rotor column;
  determining the contour of a tree, a machine rotor column position, and simultaneously a traveling speed of said agricultural machine;
  sending said tree contour and said machine speed data to a data processor;
  processing said data and controlling servomechanisms that actuate actuators which, in turn, place said rotor column in accordance with a determined tree top position and format;
  wherein all actuators are simultaneously controlled through information received from the tree contour sensors; and
  allowing the rotor column to be positioned at a plane inclined and parallel to the tree top.

12. A method of relative positioning between agricultural machines and crops on their planting rows, comprising steps which are performed in real time and during a harvest work, the steps comprising:
  providing a device for relative positioning between said agricultural machine and crops on their planting rows, comprising:
    at least two tree contour sensors disposed on said agricultural machine for sensing a contour of a tree, said agricultural machine including a rotor column having a plurality of stripping rods;
    a rotor column position sensor for said rotor column;
    a moving sensor for sensing the agricultural machine traveling speed disposed close to a tractor axle of said agricultural machine;
    at least two actuators for positioning said rotor column;
  determining a tree contour of a tree, a machine rotor column position, and simultaneously a traveling speed of said agricultural machine;
  sending said tree contour and machine speed data to a data processor;
  processing said data and controlling servomechanisms that actuate actuators which, in turn, place said rotor column in accordance with a determined tree top position and format;
  providing said two sensors at different heights to allow positioning of said rotor column inclined according to an angle processed and calculated by said data processor.

* * * * *